US006860464B1

United States Patent
Quitmeyer et al.

(10) Patent No.: US 6,860,464 B1
(45) Date of Patent: Mar. 1, 2005

(54) ELECTROMECHANICAL/PNEUMATIC ROCKET ENGINE VALVE ACTUATOR

(75) Inventors: James N. Quitmeyer, Chandler, AZ (US); Donald D. Bennett, Sun Lakes, AZ (US); Thomas F. Bergin, Phoenix, AZ (US); Ronald J. Louis, Phoenix, AZ (US); Steven T. Forrest, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/768,206

(22) Filed: Jan. 29, 2004

(51) Int. Cl.[7] .............................................. F16K 31/44
(52) U.S. Cl. .......................................... 251/14; 251/31
(58) Field of Search ................... 251/12–63.6

(56) References Cited

U.S. PATENT DOCUMENTS

| 3,704,853 | A | | 12/1972 | Waller |
| 3,982,725 | A | | 9/1976 | Clark |
| 4,167,897 | A | | 9/1979 | Bunyard |
| RE30,135 | E | | 11/1979 | Fitzwater et al. |
| 4,346,728 | A | | 8/1982 | Sulzer |
| 4,608,820 | A | | 9/1986 | White et al. |
| 4,647,003 | A | | 3/1987 | Hilpert et al. |
| 4,890,645 | A | | 1/1990 | Andersen |
| 5,036,816 | A | | 8/1991 | Mann |
| 5,325,888 | A | | 7/1994 | Stary |
| 5,791,981 | A | | 8/1998 | Drobner |
| 5,853,524 | A | * | 12/1998 | Nix ............................ 156/358 |
| 5,915,668 | A | | 6/1999 | Hodapp et al. |
| 6,371,439 | B1 | | 4/2002 | Trevisan |
| 6,431,317 | B1 | | 8/2002 | Coe |
| 6,446,660 | B1 | | 9/2002 | Goni Usabiaga |
| 6,595,487 | B2 | | 7/2003 | Johansen et al. |
| 6,691,587 | B1 | * | 2/2004 | King .......................... 74/89.35 |

* cited by examiner

Primary Examiner—Paul J. Hirsch
(74) Attorney, Agent, or Firm—Douglas A. Mullen, Esq.

(57) ABSTRACT

A valve actuator assembly is provided for selectively opening and closing a valve. The valve actuator assembly includes a primary motor and secondary motor both operatively coupled to an output shaft and adapted to receive valve position commands and operable, in response thereto, to selectively drive the output shaft in a valve open or close direction and a tertiary motor adapted to receive a flow of pressurized air and operable, in response thereto, to drive the output shaft in a valve close direction.

21 Claims, 3 Drawing Sheets

US 6,860,464 B1

ELECTROMECHANICAL/PNEUMATIC ROCKET ENGINE VALVE ACTUATOR

FIELD OF THE INVENTION

The present invention relates to valve actuators, and more particularly, a fail-safe electromechanical/pneumatic valve actuator for use in an engine.

BACKGROUND OF THE INVENTION

Valves are used in myriad systems to control the flow of fluid to and from one or more systems or components. In many systems, these valves are operated using a remotely controlled valve actuator. Such actuators include a torque source that is used to move the valve between its open and closed positions. The torque source may be, for example, a hydraulic actuator, a pneumatic actuator, or an electrical actuator, such as solenoids, and motors.

Many valve actuators are an agglomeration of several components and/or subassemblies that are interconnected and incorporated into the final valve assembly. Although these valve actuators are safe and reliable, each presents certain drawbacks. For example, a valve actuator constructed of numerous individual components and/or subassemblies may increase overall weight, size, and cost of the valve to which the actuator is coupled. In addition, the relatively large number of parts may, among other things, adversely impact the overall reliability and performance of the valve actuator. Moreover, each valve component also takes up a certain amount of scarce interior space for both mounting and connection of and electrical and/or pneumatic interface. In addition, the integrity of some subassembly designs may deteriorate more rapidly in high vibration environment, resulting in increased maintenance costs. One or more of these factors can adversely affect aircraft initial and lifetime costs, as well as aircraft down time.

Hence, there is a need for a valve actuator that has one or more of the following benefits: a fail operate fail safe design; reduced overall system and aircraft weight; improved integrity; a reduced system space envelope; and, simplified system maintenance, without adversely affecting aircraft lifecycle costs. The present invention addresses one or more of these needs.

SUMMARY OF THE INVENTION

The present invention provides a valve actuator assembly for selectively opening and closing an engine valve. The valve actuator assembly comprises an output shaft and primary, secondary and tertiary motors. The primary motor is operatively coupled to the output shaft, is adapted to receive valve position command, and is also operable, in response thereto, to selectively drive the output shaft in a valve open or valve close direction. The secondary motor is operatively coupled to the output shaft, adapted to receive valve position commands and operable, in response thereto, to selectively drive the output shaft in a valve open or close direction. The tertiary motor is operatively coupled to the output shaft, and adapted to receive a flow of fluid and operable, in response thereto, to drive the output shaft in a valve close direction.

In another embodiment of the present invention, a valve actuator assembly for selectively opening and closing a valve is provided. The valve actuator assembly includes an output shaft, first and second electric motors and a pneumatic motor. The first electric motor is operatively coupled to the output shaft, and adapted to receive valve position commands and operable, in response thereto, to selectively drive the output shaft in a valve open or close direction. The second electric motor is operatively coupled to the output shaft, and adapted to receive valve position commands and operable, in response thereto, to selectively drive the output shaft in a valve open or close direction. The pneumatic motor is operatively coupled to the output shaft, and adapted to receive a flow of fluid and operable, in response thereto, to drive the output shaft in a valve close direction.

Other independent features and advantages of the preferred valve actuator assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a specific type of valve. Thus, although the present embodiment is, for convenience of explanation, depicted and described as being implemented in a valve assembly used on fuel and oxidizer valves, it will be appreciated that it can be implemented in various other contexts of and with other types of valves.

Figure 1:
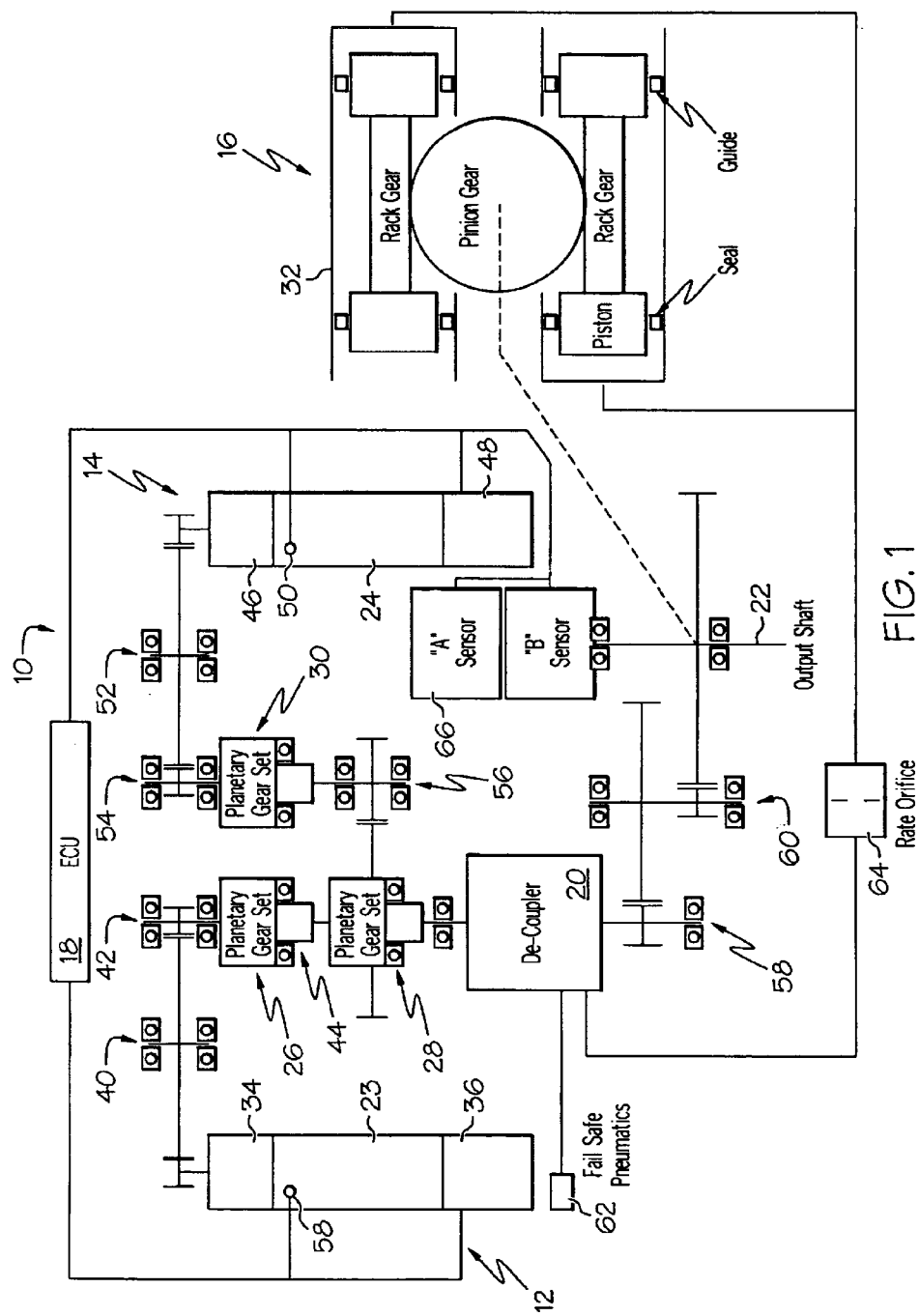
FIG. 1 is a schematic of a valve actuator according to an exemplary embodiment of the present invention.

FIG. 1 is a schematic of an exemplary valve actuator 10. The valve actuator 10 includes primary, secondary and tertiary motor assemblies or channels 12, 14, 16, a control circuit or an electronic control unit ("ECU") 18, a decoupler 20 and an output shaft 22. The primary and secondary motor assemblies 12, 14 are configured to receive valve position commands from the ECU 18 to, in response, thereby drive the output shaft 22 in an open or close direction. The primary and secondary motor assemblies 12, 14 each independently operate electrically and each include motors 23, 24 and planetary gear sets 26, 28, 30 that operatively couple the motor assemblies 12, 14 to the decoupler 20 and the output shaft 22. The tertiary motor assembly 16 includes a piston and gear assembly 32 that is coupled to and operates pneumatically to drive the output shaft 22. Each of these components will now be discussed.

The primary motor assembly 12 includes a primary motor 23, and first and second planetary gear sets 26, 28. The primary motor 23 can be an AC induction, brushless DC or brush motor and is electrically coupled to the ECU 18. The primary motor 23 includes a brake 34, a plurality of sensors 36, 38. The brake 34 is preferably configured to be an energize-to-release type brake, which is preferably configured to prevent unintended motor rotation, and thus unintended movement of the output shaft 22. In the case of a brushless DC motor, the brake 34 prevents the motor 20 from rotating, and thus generating electrical energy. The brake 34 may be an electrically actuated solenoid-type brake.

The plurality of sensors 36, 38 on the primary motor 23 can be any one of numerous types of sensors depending upon the desired system parameters to be sensed. For instance, if the primary motor 23 is a brushless DC motor, sensor 36 can be a rotational position sensor. The rotational position sensor 36 supplies signals indicating whether the motor 23 is properly commutated and/or the primary motor 23 velocity, and/or the rotational position of the motor 23. These signals are supplied to the ECU 18. Alternatively, sensor 36 can be one of various other sensors, such as a resolver or a hall sensor.

Sensor 38 can be a temperature sensor 38. In such case, the temperature sensor 38 is preferably embedded in the primary motor 23 and provides temperature data relating to the primary motor 23. The temperature sensor 38 is configured to communicate signals representative of temperature to the ECU 18 and respond to temperatures that are outside of the normal range of motor operation and can be one of numerous types of sensors that sense temperature, such as, for example, resistant thermal devices (RTD), thermal switches, or thermocouples. If the temperature sensor 38 senses that the motor 23 is too hot, the ECU 18 removes power from the primary motor 23 and causes the secondary motor 24 to power on. Alternatively, the temperature sensor 38 can be omitted from the motor configuration.

In the depicted embodiment, the primary motor 23 is coupled to the first planetary gear set 26 via a plurality of intermediary gear sets 40, 42, and the first planetary gear set 26 is coupled to the second planetary gear set 28 via gears 44 that are located thereon. The plurality of intermediary gear sets 40, 42 may include any one of numerous types of gears, including, for example, idler gears, pinion gears and spur gears. Moreover, the types of gears that are used from one intermediary gear set to another may be different, depending on the motor assembly configuration. As will be appreciated by those skilled in the art, although two intermediary gear sets are shown, more or fewer gear sets may be employed, depending upon the desired force and speed at which to drive the secondary planetary gear set 28 and voltage, current and duty cycle requirements.

The secondary motor assembly 14 includes a secondary motor 24 that is coupled to the third planetary gear set 30, which is in turn coupled to the second planetary gear set 28. Similar to the primary motor 23, the secondary motor 24 may be an AC induction, DC brushless, or brush motor. However, preferably, the secondary motor 24 is the same type of motor as the primary motor 23. The secondary motor 24 is preferably coupled to the ECU 18 and includes the same or similar configuration of components as the primary motor 23, namely, a brake 46, a rotational position sensor 48, and a temperature sensor 50. When the primary motor 23 is in operation, the secondary motor brake 46 is powered on to prevent the secondary motor 24 from being back-driven.

The secondary motor 24, the third planetary gear set 30, and second planetary gear set 28 are coupled to one another via a plurality of intermediary gear sets 52, 54, 56. As with the primary motor assembly 14, the gears used in the secondary motor assembly gear sets may be any type of gear, such as an idler, spur or pinion gear. The gear type and number of gears to be employed is dependent on spatial constraints and the configuration of the particular motor.

The secondary planetary gear set 28 is also coupled to the output shaft 22 via more intermediary gear sets 58, 60. Similar to the previous gear sets, the types and numbers of gears that are employed may vary.

Coupled between the second planetary gear set 28 and the output shaft 22 is the decoupler 20. The decoupler 20 is configured to pneumatically disengage the primary and secondary motor assemblies 12, 14 from the output shaft 22, in the event that either the primary or secondary motors 23, 24 become inoperable. The decoupler 20 prevents the output shaft 22 to be driven by either the primary or secondary motors 23, 24. The decoupler 20 preferably has a spring-loaded type configuration, wherein the spring pre-load is pneumatically overcome to cause decoupling, however, as will be appreciated, any one of numerous types of configurations wherein the decoupler 20 is pneumatically caused to decouple can be employed as well. To this end, the decoupler 20 is also coupled to or in fluid communication with a gas and pressure source 62. The gas and pressure source 62 is preferably configured to include or communicate with a valve (not shown) positioned between the gas and pressure source 62 and the decoupler 20. Preferably, the valve is kept closed electrically, so that, in the event of electrical failure, the valve opens and releases pressurized gas or fluid to act on the decoupler 20. Additionally, it is preferable that the decoupler 20 is a "jaw" type clutch, with a steep jaw for low separating forces, however, it will be appreciated that any other type of clutch or decoupling mechanism may be employed.

The tertiary motor assembly 16 includes a piston and gear assembly 32. The piston and gear assembly 32 is coupled to the output shaft 22 and configured to pneumatically drive the output shaft 22 to in a close valve direction. The rate at which the output shaft 22 is driven is controlled by a rate orifice 64 that communicates with the piston and gear assembly 32. It will be appreciated that although a piston and gear assembly 32 is depicted in the embodiment shown in FIG. 1, any assembly that is configured to pneumatically drive the output shaft 22 may be used, such as, for example a dual piston rack and pinion gear set, or single rack and pinion gear set. To this end, the assembly, in this embodiment, the piston and gear assembly 32, is coupled to a separate gas and pressure source (not shown). The piston and gear assembly 32 can also be coupled to the gas and pressure source 62 that is coupled to the decoupler 20.

The output shaft 22 includes a rotational position sensor 66 thereon, that is configured to supply rotational position signals representative of the rotational position of the output shaft 22. The rotational position sensor 66 can be one of numerous types of sensors that sense and supply positional signals, such as an RVDT or a resolver. Although one position sensor 66 is depicted herein, more than one position sensor 66 may also be employed. Preferably, the position sensor 66 is also coupled to the ECU 18 to communicate the output shaft 22 rotational position signals thereto.

Figure 2:
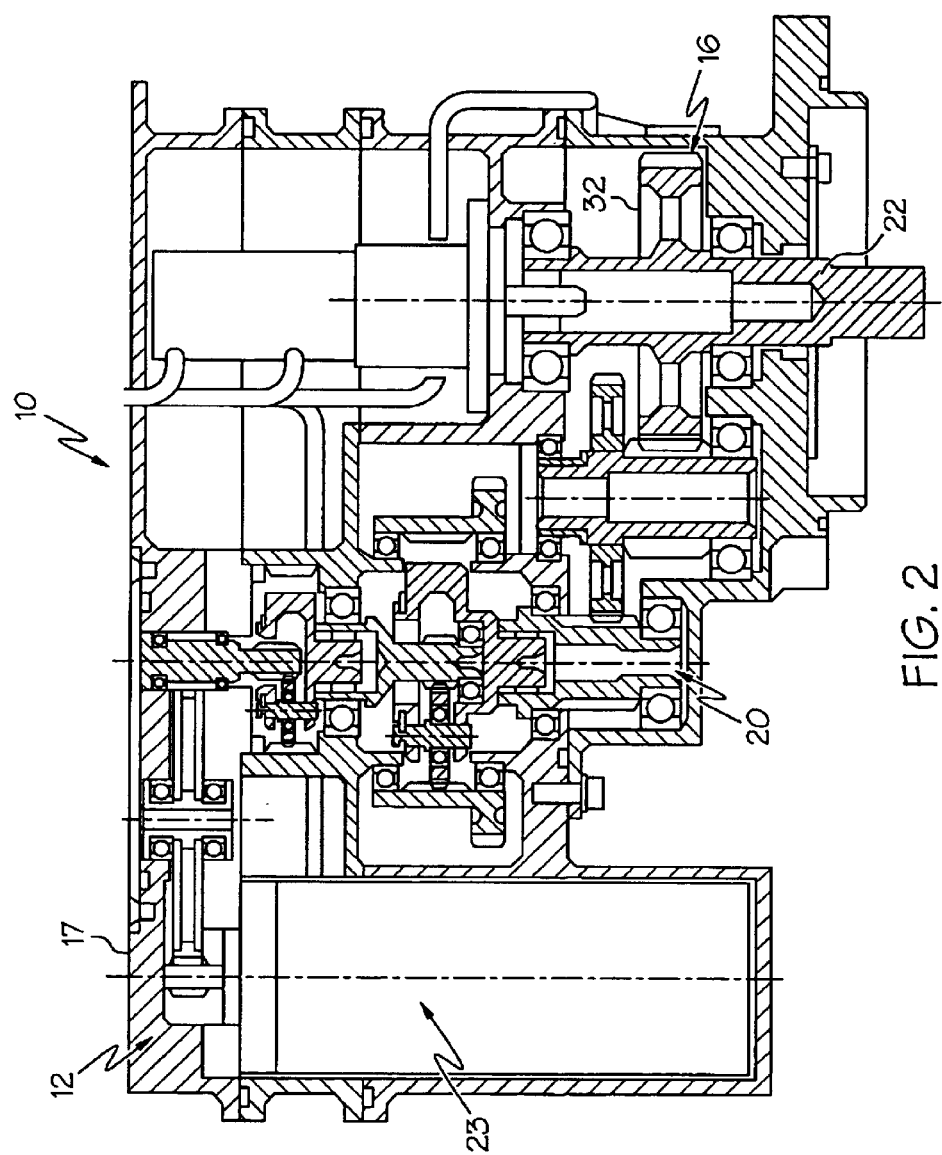
FIGS. 2 and 3 are cross section views of an exemplary valve actuator.
Figure 3:
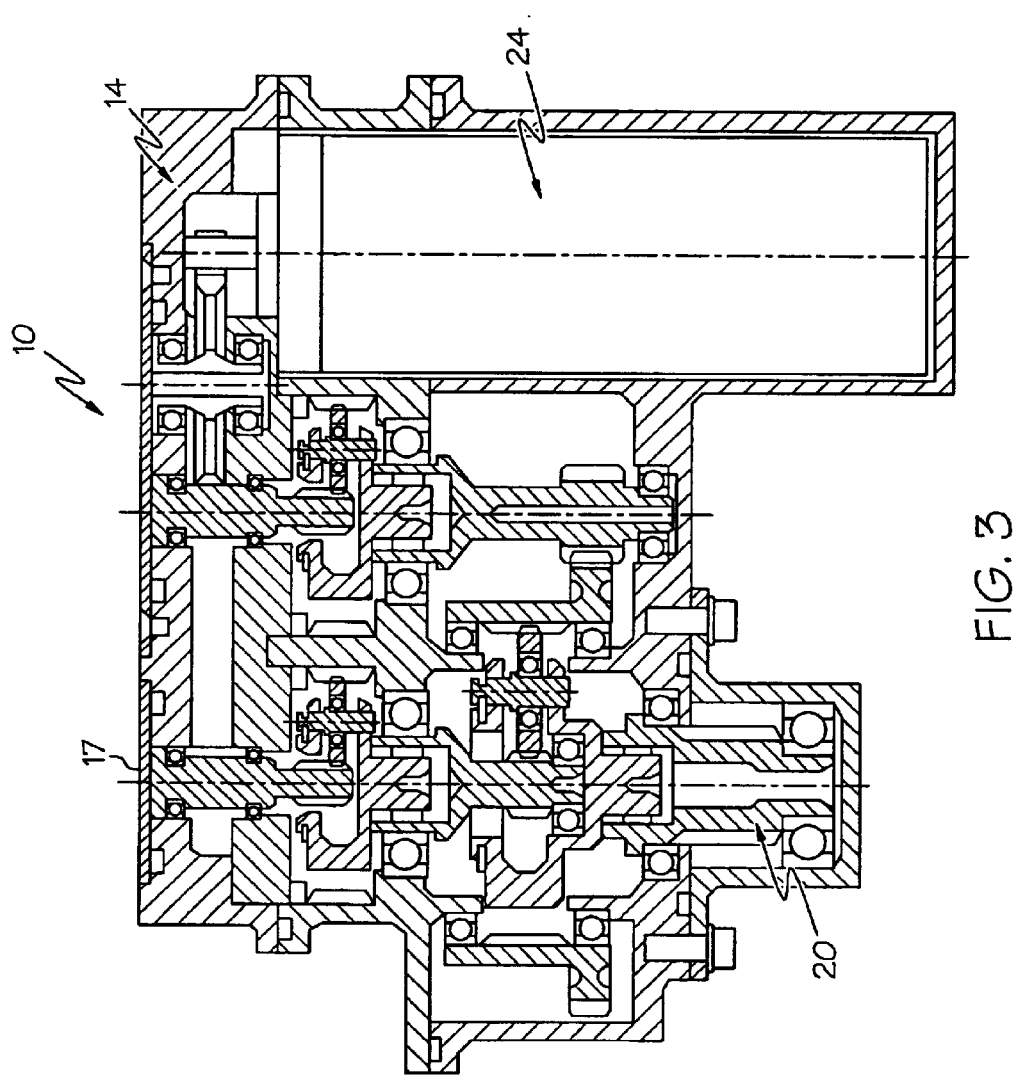

An exemplary valve actuator 10 is shown in FIGS. 2 and 3. FIGS. 2 and 3 illustrate cross section views of the primary and secondary motor assemblies 12, 14, respectively. The primary, secondary, and tertiary motor assemblies 12, 14, 16 are contained in multiple housings that are coupled together to form a single housing 17. The primary and secondary motors 23, 24 in this embodiment are DC brushless motors and each include resolvers that are in communication with and coupled to the ECU 18 for supplying rotational position signals thereto. The piston and gear assembly 32 that is coupled to the output shaft 22 is a dual piston rack and pinion gear set.

Referring again to FIG. 1, a method of operating the exemplary valve actuator 10 will now be discussed. When the valve actuator 10 is in "normal" mode, it receives a valve position command signal from the ECU 18 indicating whether the valve (not shown) should be open or shut. To this end, the brake 34 is energized to release the primary motor 23. The sensor 36 then provides signals to the ECU 18 representing primary motor 23 velocity and commutation data. The ECU 18 sends a signal to the primary motor 23 to indicate a desired position. In response, the primary motor 23 provides the desired power to drive the gear sets to which it is coupled, to thereby drive the output shaft 22 in the desired direction.

In the unlikely event that the primary motor assembly 12 fails, or is otherwise inoperable, the secondary motor assembly 14 acts as a back up motor and provides drive force to the output shaft 22. The ECU 18 removes power from the primary motor brake 34 and energizes the secondary motor brake 46. As a result, the primary motor 12 becomes idle. The secondary motor sensor 48 provides a secondary motor signal representative of motor velocity and commutation to the ECU 18 and the ECU 18, in turn, causes the secondary motor 24 to output enough power to rotate the output shaft 22 in the desired direction.

In the highly unlikely event that both the primary and secondary motor assemblies 12, 14 fail, or otherwise become inoperable, a fail safe mechanism, the tertiary motor 16, is employed. In such an event, the ECU 18 may or may not be operational. If the ECU 18 is operational, it removes power from both the primary and secondary motor brakes 34, 46 ensuring that both of the motors 23, 24 are idle. In any case, the gas and pressure source 62 provides a burst of gas or fluid to the decoupler 20 to cause disengagement of the output shaft 22 from the second planetary gear set 28. Once decoupled, a second gas and pressure source (not shown) pneumatically activates the piston and gear assembly 32 to drive the output shaft 22 to the closed position. The selective control of the pressure is provided by the rate orifice 64. Specifically, the rate orifice 64 controls the amount of gas and pressure supplied to the piston and gear assembly 32, which in turn controls the rotational speed of the output shaft 22.

The valve actuator assembly 10 configuration described above provides a smaller, and lighter valve and actuator assembly than present designs. The use of more gears between each motor assembly and output shaft assembly allows for a more compact valve actuator assembly for use in a high vibration environment. Additionally, because the valve actuator assembly is not hydraulically operated, the assembly is cleaner and requires less maintenance. Moreover, the valve actuator assembly 10 includes dual redundancy and a pneumatic fail safe override which aids in increasing overall safety and operability of the valve to which the assembly is coupled. These factors also reduce the overall size of the assembly 10, lower the assembly weight and cost, and improve overall reliability and performance.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A valve actuator assembly for selectively opening and closing a valve, the valve actuator assembly comprising:
    an output shaft;
    a primary motor operatively coupled to the output shaft, the primary motor adapted to receive valve position commands and operable, in response thereto, to selectively drive the output shaft in a valve open or a valve close direction;
    a secondary motor operatively coupled to the output shaft, the secondary motor adapted to receive valve position commands and operable, in response thereto, to selectively drive the output shaft in the valve open or valve close direction; and
    a tertiary motor operatively coupled to the output shaft, the tertiary motor adapted to receive a flow of fluid and operable, in response thereto, to drive the output shaft in the valve close direction.

2. The valve actuator assembly of claim 1, further comprising:
    a first gear set operatively coupled between the primary motor and the output shaft.

3. The valve actuator assembly of claim 2, further comprising:
    a second gear set operatively coupled between the first gear set and the output shaft.

4. The valve actuator assembly of claim 3, further comprising:
    a third gear set operatively coupled between the secondary motor and the second gear set.

5. The valve actuator assembly of claim 1, further comprising:
    a control circuit coupled to the primary and secondary motors and configured to supply the valve position commands thereto.

6. The valve actuator assembly of claim 1, further comprising:
    a decoupler coupled between the primary and secondary motors and the output shaft; the decoupler adapted to receive a flow of fluid and operable, in response thereto, to decouple the output shaft from the primary and secondary motors.

7. The valve actuator assembly of claim 1, further comprising.
    at least one position sensor mounted on the output shaft.

8. The valve actuator assembly of claim 5, further comprising:
    a brake assembly coupled to the primary motor and configured to selectively (i) engage the primary motor, whereby the primary motor is prevented from supplying a drive force to the output shaft and (ii) disengage the primary motor, whereby the primary motor is allowed to supply the drive force to the output shaft.

9. The valve actuator assembly of claim 8, wherein:
    the control circuit is further operable, in response to the valve position commands, to selectively supply brake control signals; and
    the brake assembly is coupled to receive the brake control signals and is operable, in response thereto, to selectively engage and disengage the primary motor.

10. The valve actuator assembly of claim 9, wherein the brake assembly is configured to engage the primary motor at least when the brake assembly is de-energized.

11. The valve actuator assembly of claim 5, further comprising:
    a rotational position sensor coupled to the primary motor and configured to supply one or more signals representative of a rotational position of the primary motor.

12. The valve actuator assembly of claim 11, wherein the control circuit is (i) coupled to receive the rotational position signals from the rotational position sensor and (ii) configured to supply the valve position commands based at least in part on the rotational position signals.

13. The valve actuator assembly of claim 1, wherein the primary motor is a brushless DC motor.

14. The valve actuator assembly of claim 1, wherein the primary motor is an AC induction motor.

15. The valve actuator assembly of claim 1, wherein the primary and secondary motors each further include a temperature sensor coupled thereto.

16. The valve actuator assembly of claim 15, wherein the primary and secondary motor temperature sensors are RDT sensors.

17. The valve actuator assembly of claim 15, wherein the primary and secondary motor temperature sensors are resolver sensors.

18. The valve actuator assembly of claim 15, wherein the primary and secondary motor temperature sensors are thermocouples.

19. The valve actuator assembly of claim 1, wherein the tertiary motor is a pneumatic motor and the fluid is pressurized air.

20. The valve actuator assembly of claim 19, wherein the primary and secondary motors are electric motors.

21. A valve actuator assembly for selectively opening and closing a valve, the valve actuator assembly comprising:
   an output shaft;
   a first electric motor operatively coupled to the output shaft, the first electric motor adapted to receive valve position commands and operable, in response thereto, to selectively drive the output shaft in a valve open or a valve close direction;
   a second electric motor operatively coupled to the output shaft, the second electric motor adapted to receive valve position commands and operable, in response thereto, to selectively drive the output shaft in the valve open or valve close direction; and
   a pneumatic motor operatively coupled to the output shaft, the pneumatic motor adapted to receive a flow of fluid and operable, in response thereto, to drive the output shaft in the valve close direction.

* * * * *